(12) United States Patent
Liu et al.

(10) Patent No.: US 11,257,152 B2
(45) Date of Patent: Feb. 22, 2022

(54) METHOD AND SYSTEM FOR OPTIMIZING ALLOCATION OF BORROWING REQUESTS

(71) Applicant: ALIPAY (HANGZHOU) INFORMATION TECHNOLOGY CO., LTD., Zhejiang (CN)

(72) Inventors: Gan Liu, Hangzhou (CN); Zhigang Hua, Hangzhou (CN); Zhen Wang, Hangzhou (CN); Shuang Yang, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/218,364

(22) Filed: Mar. 31, 2021

(65) Prior Publication Data
US 2021/0217082 A1    Jul. 15, 2021

Related U.S. Application Data

(63) Continuation of application No. PCT/CN2020/084504, filed on Apr. 13, 2020.

(51) Int. Cl.
*G06Q 40/02* (2012.01)
*G06N 5/04* (2006.01)
(Continued)

(52) U.S. Cl.
CPC ............ *G06Q 40/025* (2013.01); *G06N 5/04* (2013.01); *G06Q 10/06313* (2013.01); *G06Q 40/08* (2013.01)

(58) Field of Classification Search
None
See application file for complete search history.

(56) References Cited

U.S. PATENT DOCUMENTS 6,671,677 B2    12/2003   May
7,006,992 B1 *   2/2006   Packwood .............. G06F 40/18
                                                    705/38

(Continued)

FOREIGN PATENT DOCUMENTS

CN          105308640 A      2/2016
CN          110363416 A     10/2019
WO         2020068062 A1     4/2020

OTHER PUBLICATIONS

Written Opinion and International Search Report for PCT Application No. PCT/CN2020/084504 dated Dec. 31, 2020.

*Primary Examiner* — Jamie H Austin

(57) ABSTRACT

Methods, systems, and apparatus, including computer programs encoded on computer storage media, for optimizing resource allocation. The method may comprise: receiving a resource request from a user; iterating through a plurality of entities to obtain a corresponding score for each entity based at least on: a projected approval rate for the entity to approve the resource request, a projected risk for the entity to serve the resource request, and one or more multipliers applied to the projected approval rate and the projected risk; and recommending one of the plurality of entities to serve the resource request for the user based on the corresponding score, wherein the one or more multipliers are obtained by solving an optimization model constructed based on historical data collected from a previous period of time, the historical data comprising approval rates projected for the plurality of entities during the previous period of time.

16 Claims, 6 Drawing Sheets

(51) Int. Cl.
*G06Q 10/06* (2012.01)
*G06Q 40/08* (2012.01)

(56) References Cited

U.S. PATENT DOCUMENTS

| | | |
|---|---|---|
| 7,089,503 B1 | 8/2006 | Bloomquist et al. |
| 7,424,451 B1 | 9/2008 | Moore et al. |
| 7,860,781 B1 | 12/2010 | Bodi et al. |
| 8,156,023 B2 | 4/2012 | Depetris et al. |
| 8,280,806 B1 | 10/2012 | Bradley et al. |
| 8,504,470 B1 | 8/2013 | Chirehdast |
| 8,660,942 B2 | 2/2014 | Cohen et al. |
| 8,775,300 B2 | 7/2014 | Showalter |
| 10,163,156 B1 * | 12/2018 | Shapley ............... G06Q 40/025 |
| 10,558,913 B1 * | 2/2020 | Turner ................. G06N 3/0427 |
| 2003/0101132 A1 * | 5/2003 | Gaubatz ................ G06Q 40/08 |
| | | 705/38 |
| 2005/0187860 A1 * | 8/2005 | Peterson ............... G06Q 40/02 |
| | | 705/38 |
| 2007/0073613 A1 | 3/2007 | Lee |
| 2008/0249925 A1 * | 10/2008 | Nazari .................. G06Q 40/02 |
| | | 705/38 |
| 2008/0301038 A1 * | 12/2008 | Anderson ............. G06Q 40/02 |
| | | 705/38 |
| 2010/0004999 A1 | 1/2010 | Depetris et al. |
| 2010/0274708 A1 * | 10/2010 | Allen .................... G06Q 50/16 |
| | | 705/38 |
| 2014/0164217 A1 | 6/2014 | Hammock et al. |
| 2014/0214648 A1 | 7/2014 | Merrill et al. |
| 2014/0358765 A1 | 12/2014 | Agius et al. |
| 2015/0127522 A1 | 5/2015 | Lem |
| 2015/0379632 A1 | 12/2015 | Michael |
| 2017/0193596 A1 * | 7/2017 | Bol ....................... G06Q 40/025 |
| 2017/0287074 A1 * | 10/2017 | Aber ..................... G06Q 40/04 |
| 2020/0143448 A1 * | 5/2020 | Steck ................... G06Q 30/0633 |
| 2021/0192612 A1 * | 6/2021 | Fisher .................. G06Q 40/025 |

\* cited by examiner

METHOD AND SYSTEM FOR OPTIMIZING ALLOCATION OF BORROWING REQUESTS

CROSS REFERENCE TO RELATED APPLICATIONS

The application is a continuation application of International Patent Application No. PCT/CN2020/084504, filed on Apr. 13, 2020. The entire content of the above referenced application is incorporated herein by reference.

TECHNICAL FIELD

The disclosure relates generally to systems and methods for optimizing allocation of borrowing requests.

BACKGROUND

Resource allocation usually seeks to maximize the resources to allocate (e.g., to satisfy a maximum number of resource requests) with various constraints, such as limitations associated with a type of resource (e.g., the quantity of a type of goods, the serving capacity of a type of service), predetermined risk tolerance (e.g., a bank may require a loan borrower to meet a minimum credit score), other suitable constraints, or any combination thereof. The resource allocation platforms (e.g., servers or other computing systems) often need an optimal resource allocation strategy to satisfy a maximum number of requests while considering the various constraints. For example, a loan servicing platform may need to allocate loan borrowing requests received from a pool of users to cooperative financial institutions according to certain strategies. After receiving a loan borrowing request, the financial institution determines whether to approve the request, and then the amount to loan to the user. There are various considerations and limitations that may affect the financial institution's decision. As the loan servicing platform, it has to take into account the considerations and limitations from all the cooperative financial institutions in order to achieve a globally optimal strategy to allocate the borrowing requests.

SUMMARY

Various embodiments of the present specification may include systems, methods, and non-transitory computer readable media for optimizing allocation of resource borrowing requests.

According to one aspect, a method for determining resource allocation comprise: receiving a resource request from a user; iterating through a plurality of entities to obtain a corresponding score for each entity based at least on: a projected approval rate for the entity to approve the resource request, a projected risk for the entity to serve the resource request, and one or more multipliers applied to the projected approval rate and the projected risk; and recommending one of the plurality of entities to serve the resource request for the user based on the corresponding score, wherein the one or more multipliers are obtained by solving an optimization model constructed based on historical data collected from a previous period of time, the historical data comprising approval rates projected for the plurality of entities during the previous period of time.

In some embodiments, the method further comprises: constructing the optimization model based on the historical data, the optimization model comprising an objective function and one or more constraints, wherein the objective function is to maximize a target value determined at least by the projected approval rates, and the one or more constraints correspond to the one or more multipliers; and transforming the optimization model into a Lagrangian function to determine the one or more multipliers.

In some embodiments, the resource request is a loan request, the projected risk is determined based at least on a projected default rate associated with the user, a risk tolerance ratio associated with each entity, and a projected loan amount to be provided by each entity to the user; and the historical data further comprise projected default rates associated with users of the previous period of time, risk tolerance ratios associated with the plurality of entities during the previous period of time, and loan amounts that were projected by the plurality of entities during the previous period of time.

In some embodiments, the one or more constraints comprise a first constraint for each entity that the risk tolerance ratio associated with the entity is no less than a ratio determined based at least on the projected default rate associated with the user and the projected loan amount to be provided to the user by the entity.

In some embodiments, the first constraint corresponds to a first multiplier, and the projected risk is associated with the first multiplier for obtaining the corresponding score for each entity.

In some embodiments, each entity is associated with a user flow percentage to determine a serving capacity of the entity for the previous period of time.

In some embodiments, the history data further comprise a total number of users made requests during the previous period of time, and the serving capacity is determined based on a product of the user flow percentage associated with each entity and the total number of users made requests during the previous period of time.

In some embodiments, the one or more constraints further comprise a second constraint for each entity that a total number of users to be served by the entity is no more than the serving capacity of the entity.

In some embodiments, the second constraint corresponds to a second multiplier for obtaining the corresponding score for each entity.

In some embodiments, the user flow percentage associated with each entity is updated for a current period of time if a total number of users served by the entity during the previous period of time does not match the serving capacity of the entity for the previous period of time.

In some embodiments, the optimization model comprises decision variables, and the solution of the optimization model determines a binary value for each of the decision variables indicating whether to recommend a corresponding user to a corresponding entity.

In some embodiments, the recommending one of the plurality of entities to serve the resource request for the user comprises: selecting the one entity with a highest corresponding score.

According to other embodiments, a system for determining resource allocation comprises one or more processors and one or more computer-readable memories coupled to the one or more processors and having instructions stored thereon that are executable by the one or more processors to perform the method of any of the preceding embodiments.

According to yet other embodiments, a non-transitory computer-readable storage medium is configured with instructions executable by one or more processors to cause the one or more processors to perform the method of any of the preceding embodiments.

According to still other embodiments, an apparatus for determining resource allocation comprises a plurality of modules for performing the method of any of the preceding embodiments.

According to another aspect, a system for determining resource allocation may comprise a computer system comprising a processor and a non-transitory computer-readable storage medium storing instructions executable by the processor to cause the computer system to perform operations comprising: receiving a resource request from a user; iterating through a plurality of entities to obtain a corresponding score for each entity based at least on: a projected approval rate for the entity to approve the resource request, a projected risk for the entity to serve the resource request, and one or more multipliers applied to the projected approval rate and the projected risk; and recommending one of the plurality of entities to serve the resource request for the user based on the corresponding score, wherein the one or more multipliers are obtained by solving an optimization model constructed based on historical data collected from a previous period of time, the historical data comprising approval rates projected by the plurality of entities during the previous period of time.

According to yet another aspect, a non-transitory computer-readable storage medium for determining resource allocation may be configured with instructions executable by one or more processors to cause the one or more processors to perform operations comprising: receiving a resource request from a user; iterating through a plurality of entities to obtain a corresponding score for each entity based at least on: a projected approval rate for the entity to approve the resource request, a projected risk for the entity to serve the resource request, and one or more multipliers applied to the projected approval rate and the projected risk; and recommending one of the plurality of entities to serve the resource request for the user based on the corresponding score, wherein the one or more multipliers are obtained by solving an optimization model constructed based on historical data collected from a previous period of time, the historical data comprising approval rates projected by the plurality of entities during the previous period of time.

Embodiments disclosed in the specification have one or more technical effects. In one embodiment, the disclosed methods and systems adopt an online decision system to allocate loan borrowing requests to financial institutions. The online decision system considers various factors (e.g., projected approval rates, and loan utilization rates) when making allocation decisions while ensures the risk and manages the flow control for the financial institutions. Such online decision system may provide a globally optimized strategy for allocating the loan borrowing requests. In some embodiments, the disclosed methods and systems collect historical data from a past period of time, and construct an optimization model based on the historical data. The solution to such optimization model may provide an ideal allocation strategy for the past period of time. Some of the parameters (e.g., multipliers) associated with the solution are fed into the online decision system for making allocation decisions in the next period of time. Empirical evidence shows that the distribution of the data (e.g., borrowers' features, and financial institutions' features) in one period of time may not change dramatically in the next period of time. As a result, the ideal allocation strategy obtained by solving the optimization model constructed based on the historical data (e.g., from the past period of time) may help optimize the allocation decisions in the next period of time.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
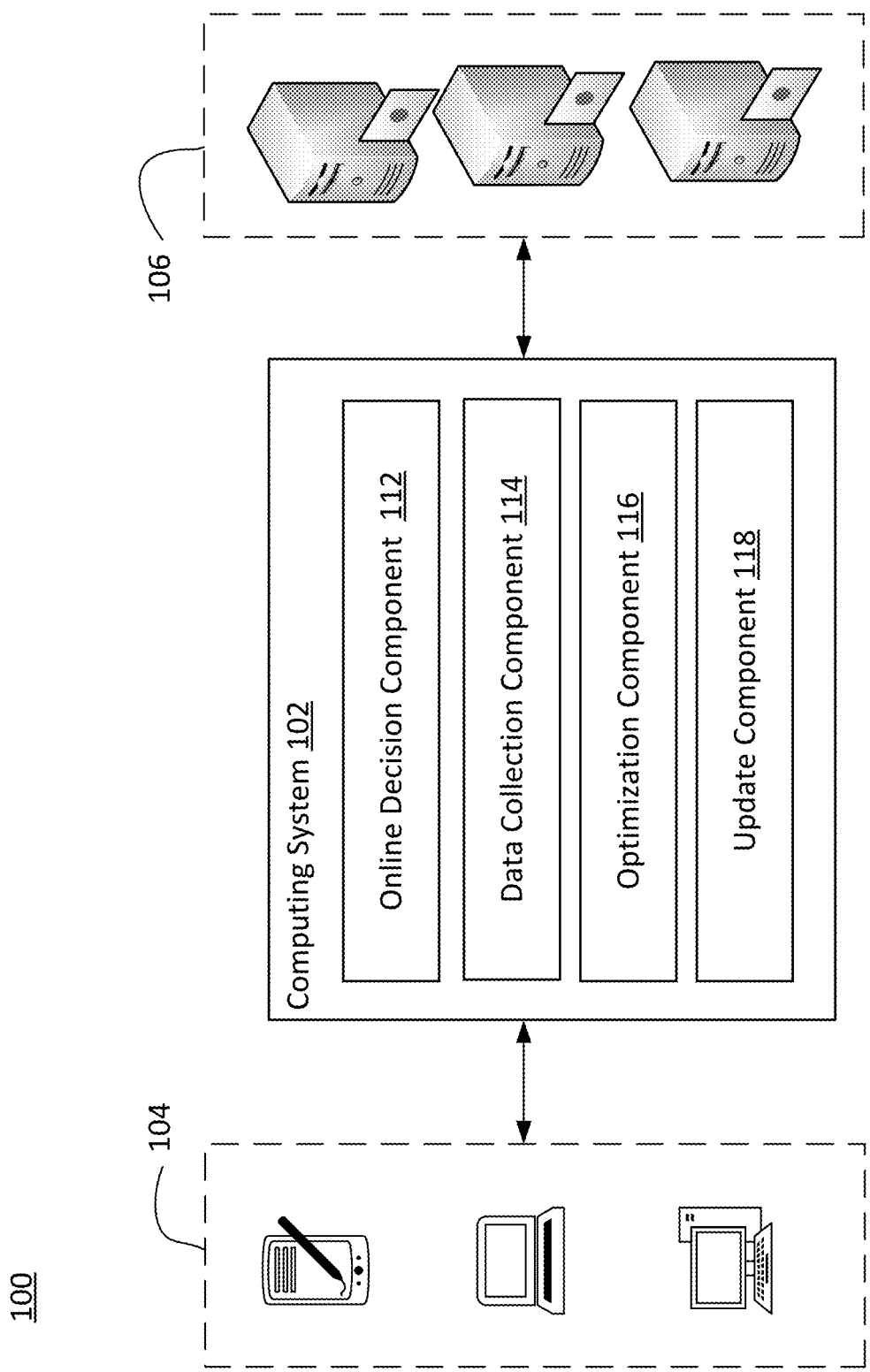
FIG. 1 illustrates an example environment for determining allocation of borrowing requests, in accordance with various embodiments.

The approaches disclosed herein may determine optimal resource allocation plans for constrained resource allocation use cases. A constrained resource allocation usually seeks to maximize the resources to allocate (e.g., to satisfy a maximum number of resource requests) with various constraints, such as limitations associated with a type of resource (e.g., the quantity of a type of goods, the serving capacity of a type of service), predetermined risk tolerance (e.g., a bank may require a loan borrower to meet a minimum credit score), other suitable constraints, or any combination thereof.

One constrained resource allocation embodiment may be data storage resource allocation in a computing system (e.g., a standalone computer system, a data center, a cloud storage service). Within such computing system, running services may need to store data to meet various requirements. For example, some data (e.g., personal information, customer data) may require higher privacy protection than other data, and thus may request the computing system (specifically, the storage subsystem of the computing system) to allocate the corresponding storage resources (e.g., such storage resources may implement more strict data encryption and access control mechanisms). As another example, depending on the nature of the data, a running service in the computing system may request online storage resources (to store the active data currently being used or having a high likelihood to be used), backup storage resources (e.g., archive storage resource to store the older data that remains important to the organization or must be retained for future reference or regulatory compliance reasons), or nearline storage resources (e.g., the data that is not active data nor achieve data). In these scenarios, in response to the resource allocation requests from the running services, the computing system may seek for an optimal resource allocation plan to satisfy a maximum number of requests while considering the various constraints, such as the maximum level of privacy protection that can be provided by a type of resource, the total available capacity of a type of resource, etc.

Another constrained resource allocation embodiment may be exemplified by a loan servicing platform where a plurality of financial institutions (e.g., loan lenders) provide loan services to loan borrowers. In such platform, when a borrower (e.g., a customer) makes a loan borrowing request to a loan servicing platform, the platform may allocate the request to one of a plurality of lenders (e.g., cooperative financial institutions) to serve the request by considering various factors, such as the customer flow limit associated with each lender (may also be called as user flow percentage defining a serving capacity offered by the corresponding lender), the maximum risk tolerance associated with each lender, other suitable constraints/factors, or any combination thereof. During this process, the platform may need to obtain various factors, such as a projected probability (e.g., an approval rate) that a lender may approve the user's borrowing request, a projected probability that the user may use the lender's product (e.g., loan), a projected amount that the lender may lend to the user, a projected amount that the user may in fact use, a default rate associated with the user, a risk tolerance limit corresponding the lender, a service capacity associated with the lender, another suitable factor, or any combination thereof. In some embodiments, these factors may be obtained by the platform from the plurality of lenders, a third-party institution, or another suitable party. For the convenience of description, these factors are presumed as known in the following description.

In the following description, the above-mentioned loan borrowing platform is used as an example to describe the embodiments of the disclosed methods, systems, and storage medium. However, it may be noted that these disclosed methods, systems, and storage medium may be applicable to other constrained resource allocation use cases.

In this specification, a loan borrowing request is one to one mapped to a customer/loan borrower. This assumption may be reasonably expanded as one customer may borrow multiple loans, and each loan may be associated with multiple customers. However, these expanded cases may be easily transformed so that the previous assumption still applies. For example, when a customer is associated with multiple loans, it is possible to treat the customer behind each of the loans as an individual (even though the individuals refer to the same person).

In some embodiments, upon receiving a borrowing request, the loan servicing platform may score each of the plurality of lenders based on an online decision system corresponding to the request, and allocate the request (e.g., by connecting the customer with the lender, or by forwarding the request to the lender) to a lender with the highest score to serve. In some embodiments, the online decision system may select the lender j* for a borrowing request i based on the following formula shown in formula (1).

$$j^* = \arg\max_j \{s_{ij}k_{ij} - \lambda_j c_{ij} u_{ij}(p_i - r_j) - \mu_j\} \quad (1)$$

where i is the borrower/request identifier (assuming the request is one-to-one mapped to the borrower), j is a lender identifier, $s_{ij}$ is the projected approval rate that the lender j will approve the request i, $k_{ij}$ is the projected product usage probability that the borrower may actually use the loan from the lender j (e.g., a borrower may have a higher projected product usage probability if he or she has prior positive user experience with the lender), $c_{ij}$ is the projected loan amount (e.g., credit amount) the lender j will lend to the borrower, $u_{ij}$ is the projected loan usage rate representing the percentage of the loan that the borrower may likely use (e.g., spend), $p_i$ is the predicted default rate of the borrower (e.g., it may be obtained based on a unique identifier (e.g., SSN) associated with the borrower), $r_j$ is the risk tolerance limit corresponding to the lender j, $\lambda_j$ is a multiplier associated with risk related factors for the lender j, and $\mu_j$ is a multiplier associated with servicing capacity related factors (e.g., factors related to consumer flow control) of lender j.

In some embodiments, the online decision system may be updated periodically to be responsive to a change of circumstance, such as user traffic changes, lenders quota changes (e.g., a risk tolerance limit change, a servicing capacity change), other suitable changes, or any combination thereof. In some embodiments, the online decision system may be updated according to historical data based on the assumption as well as empirical evidence that the change of circumstances between two adjacent periods of time may not be significant.

FIG. 1 illustrates an example environment for determining allocation of borrowing requests, in accordance with various embodiments. As shown in FIG. 1, the environment may comprise computing devices 104 associated with borrowers. The borrowers may create and send loan borrowing requests using the computing devices 104 to a computing system 102 associated with a loan servicing platform. The environment may also comprise servers 106 associated with lenders (e.g., financial institutions partnered with the loan servicing platform). The computing system 102 may allocate a received loan borrowing request to the servers 106 associated with one lender (e.g., one lender may correspond to one or more servers 106).

The components of the computing system 102 shown in FIG. 1 are intended to be illustrative. Depending on the implementation, the computing system 102 may include additional, fewer, or alternative components. The computing system 102 may be implemented in one or more networks (e.g., enterprise networks), one or more endpoints, one or more servers, or one or more clouds. The computing system 102 may include hardware or software which manages access to a centralized resource or service in a network. A cloud may include a cluster of servers and other devices which are distributed across a network. In some embodiments, the computing system 102 may be understood as an online decision platform to determine an allocation strategy to allocate a stream of loan borrowing requests to a plurality of lenders.

In some embodiments, the computing system 102 may include an online decision component 112, a data collection component 114, an optimization component 116, and an update component 118. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and one or more memories (e.g., permanent memory, temporary memory, non-transitory computer-readable storage medium). The one or more memories may be configured with instructions executable by the one or more processors. The processor(s) may be configured to perform various operations by interpreting machine-readable instructions stored in the memory.

In some embodiments, the online decision component 112 of the computing system 102 may determine which lender a loan borrowing request should be allocated to. The online decision component 112 may comprise a scoring model to score the plurality of lenders in response to the loan borrowing request, and allocate (e.g., assign) the request to the lender with the highest score. In some embodiments, the scoring model may comprise a formula shown in formula (1). In some embodiments, the formula used by the scoring model may comprise less, more, or alternative factors. For example, the $k_{ij}$ of the formula in (1) (e.g., the projected product usage probability that the borrower may actually use the loan from the lender j) may be assumed to be 100% or another fixed value (e.g., once the request is approved, the borrower will have a fixed probability to use the loan from the lender). As another example, a lender may have more than one risk tolerance limits depending on the size of the loan.

In some embodiments, the data collection component 114 of the computing system 102 may keep collecting data for a period of time. The collected data may comprise various variables used in the online decision component 112. For example, the data collection component 114 may collect, for every loan borrowing request allocated during the previous one hour, one or more variables used for scoring each of the lenders, such as $s_{ij}$ (e.g., the projected approval rate that the lender j will approve the request i), $k_{ij}$ (e.g., the projected product usage probability that the borrower may actually use the loan from the lender j), $c_{ij}$ (e.g., the projected loan amount the lender j will lend to the borrower), $u_{ij}$ (e.g., the projected loan usage rate representing the percentage of the loan that the borrower may likely use), $p_i$ (e.g., the predicted default rate associated with the borrower), $r_j$ (e.g., the risk tolerance limit corresponding to the lender j).

In some embodiments, the optimization component 116 of the computing system 102 may construct an optimization problem based on historical data collected by the data collection component 114 during a past period of time. The optimization problem may comprise an objective function and one or more constraints. A solution to such optimization problem may provide an ideal allocation strategy for the past period of time that maximizes the objective function. For example, the objective function may be designed to maximize the total amount of loans that are likely to be lent and spent. In some embodiments, the optimization problem may comprise one or more constraints for each lender. For example, a risk related constraint may require, for a given allocation strategy for the past period of time, a total risk that the lender bears must be equal to or smaller than the risk tolerance limit associated with the lender. As another example, a flow control related constraint may require, for a given allocation strategy for the last period of time, a total number of requests served by the lender must be equal to or smaller than the serving capacity of the lender. The serving capacity of the lender may be determined based on the total number of requests made during the past period time and a percentage associated with the lender. The percentage may be determined by the loan servicing platform and adjustable.

In some embodiments, the optimization problem may comprise a plurality of decision variables. Solving the optimization problem may determine the values for the plurality of decision variables (e.g., the values of the decision variables are the solution of the optimization problem). Each of the decision variables may indicate whether to allocate a request to a lender.

In some embodiments, in the process of solving the optimization problem, one or more multipliers may be obtained. Each of the multipliers may correspond to one of constraints of the optimization problem. In some embodiments, the multipliers are used by the online decision component 112 (e.g., in the scoring model) to make allocation decisions.

In some embodiments, the update component 118 of the computing system 102 may update the scoring model of the online decision component 112. For example, the one or more multipliers in the scoring model may be replaced by the new multipliers obtained during the process of solving the optimization problem. Since the new multipliers are obtained based on the most recent historical data (e.g., more precisely, the new multipliers are obtained during the process of solving the optimization problem constructed using the most recent historical data), they may better reflect the change of circumstances, such as user traffic changes, lenders quota changes (e.g., a risk tolerance limit change, a servicing capacity change), other suitable changes, or any combination thereof.

Figure 2:
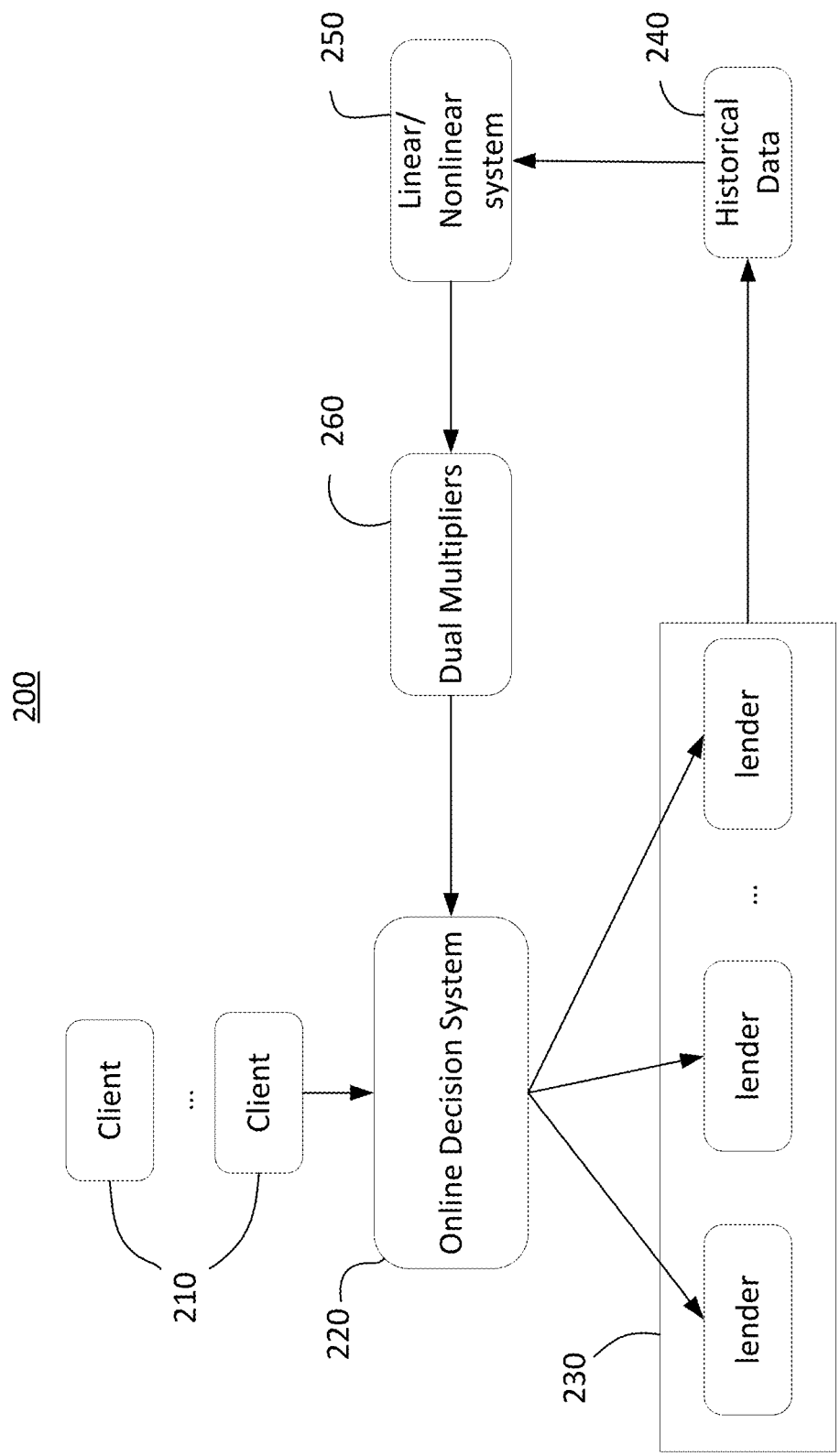
FIG. 2 illustrates an example system flow for determining allocation of borrowing requests, in accordance with various embodiments.

FIG. 2 illustrates an example system flow 200 for determining allocation of borrowing requests, in accordance with various embodiments. As shown in FIG. 2, the clients 210 may represent loan borrowing requests. In some cases, a client may send multiple requests (e.g., for multiple loans), or a loan request may be made by multiple clients (e.g., co-borrowers). For the sake of simplicity of description, this specification assumes one client corresponds to one loan request. Even though the clients 210 in FIG. 2 are shown as arriving and being processed sequentially, in some embodiments, they may arrive and be processed in parallel.

In some embodiments, for one client (e.g., one loan borrowing request), the online decision system 220 may score each of the lenders 230 using a scoring model. The client may then be allocated to the lender with the highest score. In some embodiments, the scoring model may use the formula shown in formula (1).

In some embodiments, the online decision system 220 may repeatedly perform the above operations (e.g., receiving loan borrowing requests, scoring the lenders 230, and allocating the requests) and collecting data for a period of time. The historical data 240 may be collected during this period of time. The historical data 240 may include a plurality of projected approval rates, each indicating the probability for a lender j to approve a loan request i. In some embodiments, the duration of the period of time may be one hour, thirty minutes, ten minutes, or another suitable duration. This duration of the period may be determined based on experimental runs on training data (e.g., a set of historical data that is different from the historical data 240).

In some embodiments, the historical data 240 collected during the past period of time may be used to construct an optimization problem with an objective function and one or more constraints. For example, the optimization problem may be constructed as below.

$$\max_{x_{ij}} \sum_i \sum_j s_{ij} k_{ij} x_{ij} \qquad (2)$$

$$\text{s.t.} \quad \frac{\sum_i c_{ij} u_{ij} p_{ij} x_{ij}}{\sum_i c_{ij} u_{ij} x_{ij}} \leq r_j \ \forall j \qquad (3)$$

-continued $$\sum_i x_{ij} \le b_j N \ \forall \ j \quad (4)$$

$$\sum_j x_{ij} = 1 \ \forall \ i$$

$$x_{ij} \in \{0, 1\}$$

where i is the borrower/borrowing request identifier (assuming the borrowing request is one-to-one mapped to the borrower), j is a lender identifier, $s_{ij}$ is the projected approval rate that the lender j will approve the borrowing request i, $k_{ij}$ is the projected product usage probability that the borrower may actually use the loan from the lender j (e.g., a borrower may have a higher projected product usage probability if he or she has prior positive user experience with the lender), $c_{ij}$ is the projected loan amount (e.g., credit amount) the lender j will lend to the borrower, $u_{ij}$ is the projected loan usage rate representing the percentage of the loan that the borrower may likely use (e.g., spend), $p_i$ is the predicted default rate of the borrower (e.g., it may be obtained based on a unique identifier, such as, SSN, associated with the borrower), $r_j$ is the risk tolerance limit corresponding to the lender j, $b_j$ is a maximized percentage of clients that may be allocated to lender j, N is the total number of clients (e.g., the total number of loan borrowing requests) received during the past period of time, $\lambda_j$ is a multiplier associated with risk related factors for the lender j, and $\mu_j$ is a multiplier associated with servicing capacity related factors (e.g., factors related to consumer flow control) of lender j. That is, formula (2) is the objective function where a maximum target value (e.g., $\Sigma_i \Sigma_j s_{ij} k_{ij} x_{ij}$) is to be explored, formula (3) is a first constraint related to a default rate (e.g., the risk tolerance ratio $r_j$ associated with lender j is no less than a ratio determined based at least on the projected default rate $p_i$ associated with the user and the projected loan amount $c_{ij}$ to be provided to the user by lender j), and formula (4) is a second constraint related to a user flow limit of lender j (e.g., a user flow percentage defining "a percentage, such as 5%, of the total number of customers that lender j is willing to serve during a period of time").

In some embodiments, $b_j$ (e.g., maximized percentage of clients that may be allocated to lender j) for lender j may be initially determined by the lender j, by the loan servicing platform, or by both (e.g., through negotiation), and may be updated dynamically according to the performance of the allocation during the past period of time. For example, when a total percentage of clients allocated to lender j during the past period of time is greater than $b_j$, then $b_j$ may be increased by a predetermined margin for the next period of time. As another example, when the total percentage of clients allocated to lender j during the past period of time is less than $b_j$, then $b_j$ may be decreased by the predetermined margin for the next period of time. In some embodiments, a marginal difference between $b_j$ and the total percentage of clients allocated to lender j may be allowed. For example, $b_j$ may skip updating if the difference between its value and the total percentage of clients allocated to lender j in the last period is smaller than 1%).

In some embodiments, the optimization problem represented by formulas (2) (3) and (4) may be solved by using various solvers, such as a CP solver, an IP solver, a SAT solver, a hybrid version of aforementioned solver, or another suitable solver (e.g., a solver developed in-house). Since the objective function in formula (2) and the constraints in formulas (3) and (4) are all linear, the optimization problem may be solved by a linear system 250. A person in the art may appreciate that the linear system 250 may be replaced by a nonlinear system to solve the optimization problem. The constraints in formula (3) (or (4)) may comprise a plurality of constraints, with each constraint corresponding to a lender. For example, for 100 lenders, the constraints in formula (3) (or (4)) may comprise 100 constraints.

During the process of solving the optimization problem, one or more dual multipliers 260 (e.g., Lagrange multipliers) may be obtained. In some embodiments, the one or more dual multipliers 260 may correspond to constraints in formulas (3) and (4). Since the constraints in formula (3) are risk-related, the dual multipliers 260 corresponding to the constraints in formula (3) may be referred to as risk-related multipliers. Similarly, since the constraints in formula (4) are client flow-related, the dual multipliers 260 corresponding to the constraints in formula (4) may be referred to as client flow-related multipliers.

In some embodiments, the online decision system 220 may update its scoring model (e.g., as shown in formula (1)) by using the newly obtained dual multipliers 260. For example, the newly obtained risk-related multipliers may be used as $\lambda_j$ in formula (1), and the newly obtained flow-related multipliers may be used as $\mu_j$ in formula (1). By applying the multipliers 260 learned from solving the optimization problem based on the most recent history data (e.g., the past period of time), the updated scoring model in the online decision system 220 may be adopted to make allocation decisions for the next period of time. The rationale behind this system may be related to a presumption that the features (e.g., or distribution of the features) of the clients arriving in the next period of time may be similar to the features (e.g., or distribution of the features) of the clients that have arrived in the past period of time. In order to make this presumption reasonably accurate, the loan servicing platform may need to determine a proper length of each period of time. A longer period of time may lead to a greater change of the features of the clients. According to empirical experience (e.g., learned from historical data), one hour may be determined as the proper length of a period of time.

Figure 3:
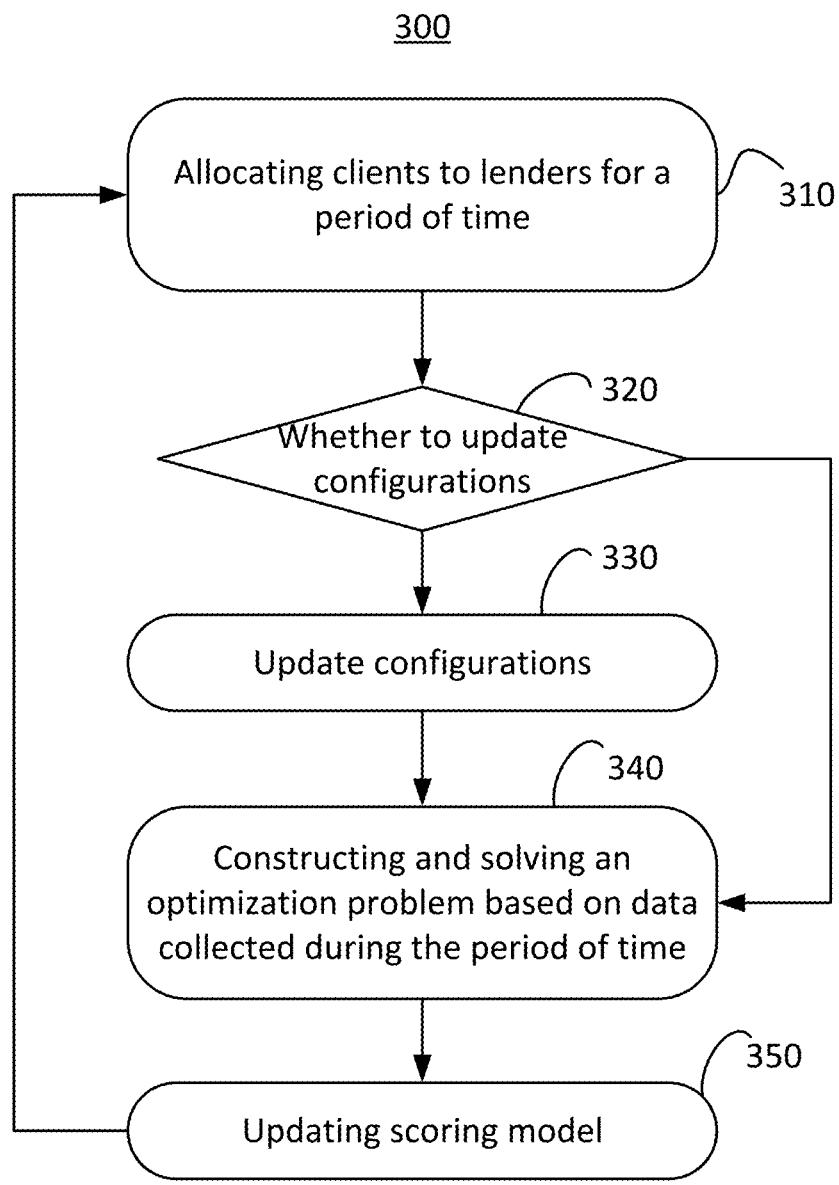
FIG. 3 illustrates an example method for determining allocation of borrowing requests, in accordance with various embodiments.

FIG. 3 illustrates an example method 300 for determining allocation of borrowing requests, in accordance with various embodiments. The method 300 may be performed by a loan servicing platform. As shown in FIG. 3, the method 300 may comprise a loop, during which multiple operations may be performed. The order of the operations shown in FIG. 3 is intended to be illustrative, and may be changed depending on implementation. For example, steps 320 and 330 may be performed after step 350.

The operations may comprise allocating clients to lenders for a period of time at step 310. When a client is allocated to a lender, the lender may determine whether the client's loan borrowing request may be approved. In some embodiments, the lender may determine, after approving the client's request, the amount of the loan to be lent to the client (e.g., it may be the same as an amount requested by the client, or an amount determined by the loan servicing platform).

In some embodiments, after the period of time, the loan servicing platform may determine whether to update its configurations at step 320. If no update is necessary, the flow 300 may proceed to step 340. Otherwise, some configurations of the platform may be updated at step 330. For example, if the platform uses a scoring model for determining the allocation of the received requests, certain parameters in the scoring model may be updated (e.g., if certain lenders do not care about flow control, the scoring model may ignore these clients when scoring them). As another example, if the platform determines the allocation during the past period of time violates a client flow constraint for a lender (e.g., the lender received more clients than it agreed to serve), the corresponding client flow-control parameter (e.g., $b_j$ in formula (4) for lender j) may be adjusted accordingly.

In some embodiments, a plurality of variables may be collected during the process of allocating loan borrowing requests to lenders from the past period of time. The variables may be used to construct an optimization problem at step 340. A solution to the optimization problem provides an optimal allocation strategy for the past period of time, and may also determine certain multipliers that may be used in the scoring model of the platform in order to make allocation decisions for the next period of time.

In some embodiments, once the multipliers are determined during the process of solving the optimization problem, the scoring model of the platform may be updated at step 350. The new model may be deployed for the next period of time.

Figure 4:
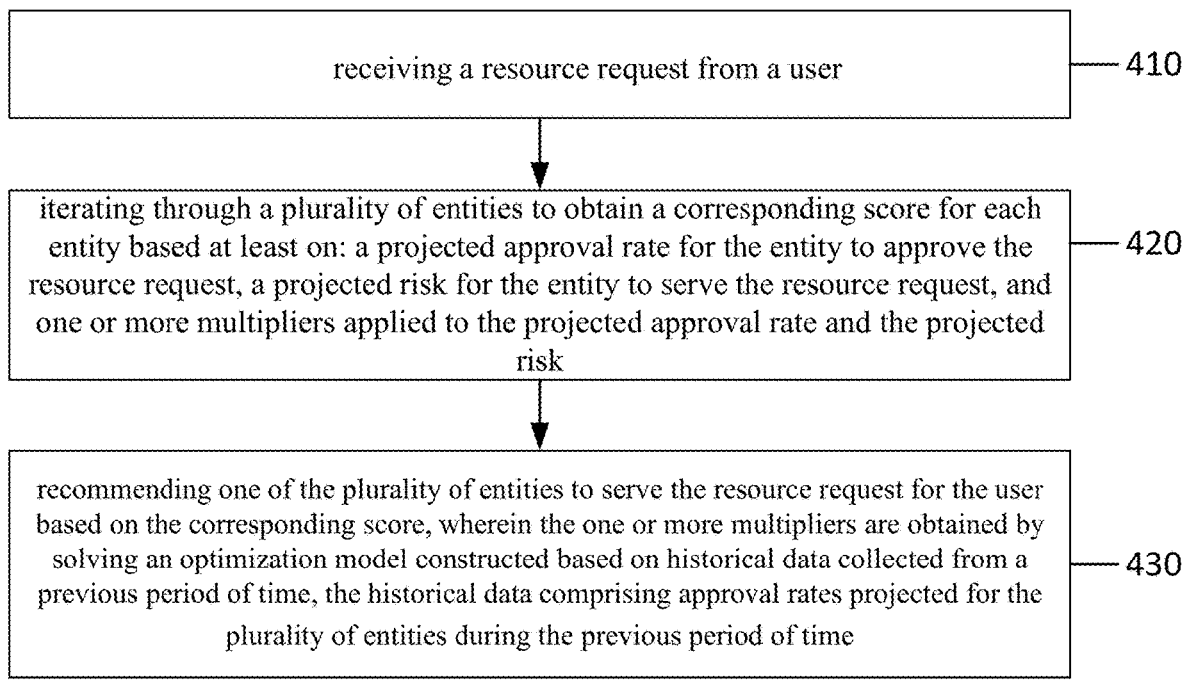
FIG. 4 illustrates another example method for determining allocation of borrowing requests, in accordance with various embodiments.

FIG. 4 illustrates a method for determining resource allocation. The method may be implemented by the computing system 102 shown in FIG. 1, the system shown in FIG. 2, and correspond to the flow shown in FIG. 3. Depending on the implementation, the method may have additional, fewer, or alternative steps.

Block 410 includes receiving a resource request from a user.

Block 420 includes iterating through a plurality of entities to obtain a corresponding score for each entity based at least on: a projected approval rate for the entity to approve the resource request, a projected risk for the entity to serve the resource request, and one or more multipliers applied to the projected approval rate and the projected risk. In some embodiments, the resource request is a loan request, the projected risk is determined based at least on a projected default rate associated with the user, a risk tolerance ratio associated with each entity, and a projected loan amount to be provided by each entity to the user. In some embodiments, each entity is associated with a user flow percentage to determine a serving capacity of the entity for the previous period of time. In some embodiments, the user flow percentage associated with each entity is updated for a current period of time if a total number of users served by the entity during the previous period of time does not match the serving capacity of the entity for the previous period of time.

Block 430 includes recommending one of the plurality of entities to serve the resource request for the user based on the corresponding score, wherein the one or more multipliers are obtained by solving an optimization model constructed based on historical data collected from a previous period of time, the historical data comprising approval rates projected by the plurality of entities during the previous period of time. In some embodiments, the historical data further comprise projected default rates associated with users of the previous period of time, risk tolerance ratios associated with the plurality of entities during the previous period of time, and loan amounts that were projected by the plurality of entities during the previous period of time. In some embodiments, the history data further comprise a total number of users made requests during the previous period of time, and the serving capacity is determined based on a product of the user flow percentage associated with the entity and the total number of users made requests during the previous period of time. In some embodiments, the optimization model comprises decision variables, and the solution of the optimization model determines a binary value for each of the decision variables indicating whether to recommend a corresponding user to a corresponding entity. In some embodiments, the recommending one of the plurality of entities to serve the resource request for the user comprises: selecting the one entity with a highest corresponding score.

In some embodiments, the method further comprises: constructing the optimization model based on the historical data, the optimization model comprising an objective function and one or more constraints, wherein the objective function is to maximize a target value determined at least by the projected approval rates, and the one or more constraints correspond to the one or more multipliers; and transforming the optimization model into a Lagrangian function to find the one or more multipliers. In some embodiments, the one or more constraints comprise, for a given loan allocation solution, a first constraint for each entity that the risk tolerance ratio associated with the entity is no less than a ratio determined based at least on the projected default rate associated with the user and the projected loan amount to be provided to the user by the entity. In some embodiments, the first constraint corresponds to a first multiplier, and the projected risk is associated with the first multiplier for obtaining the corresponding score for the entity. In some embodiments, the one or more constraints further comprise, for a given resource allocation solution, a second constraint for the entity that a total number of users to be served by the entity is no more than the serving capacity of the entity. In some embodiments, the second constraint corresponds to a second multiplier for obtaining the corresponding score for the entity.

Figure 5:
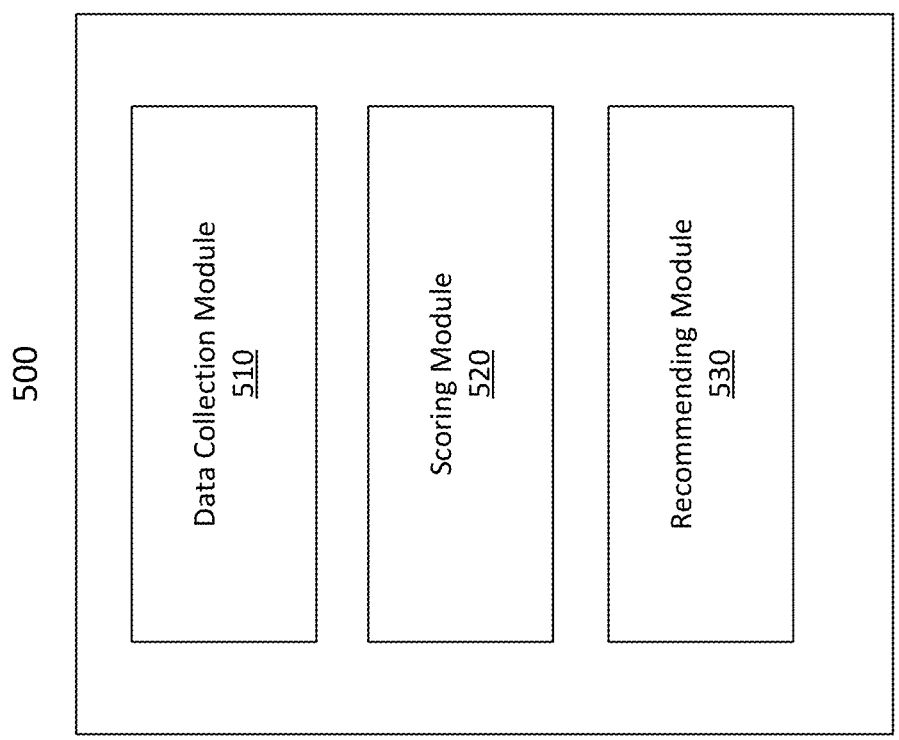
FIG. 5 illustrates a block diagram of a computer system apparatus for determining allocation of borrowing requests in accordance with some embodiments.

FIG. 5 illustrates a block diagram of a computer system apparatus for determining allocation of borrowing requests in accordance with some embodiments. The components of the computer system 500 presented below are intended to be illustrative. Depending on the implementation, the computer system 500 may include additional, fewer, or alternative components.

The computer system 500 may be an example of an implementation of one or more components of the computing system 102. The flows and methods illustrated in FIGS. 1-4 may be implemented by the computer system 500. The computer system 500 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 400. The computer system 500 may comprise various units/modules corresponding to the instructions (e.g., software instructions).

In some embodiments, the computer system 500 may be referred to as an apparatus for determining allocation of loan borrowing requests. The apparatus may comprise a data collection module 510, a scoring module 520, and a recommending module 530. In some embodiments, the data collection module 510 may receive a loan request from a user; the scoring module 520 may iterate through a plurality of lenders to obtain a corresponding score for each lender based at least on: a projected approval rate for the lender to approve the loan request, a projected risk for the lender to serve the loan request, and one or more multipliers applied to the projected approval rate and the projected risk; and the recommending module 530 may recommend one of the plurality of lenders to serve the loan request for the user based on the corresponding score, wherein the one or more multipliers are obtained by solving an optimization model constructed based on historical data collected from a previous period of time, the historical data comprising approval rates projected by the plurality of entities during the previous period of time.

Figure 6:
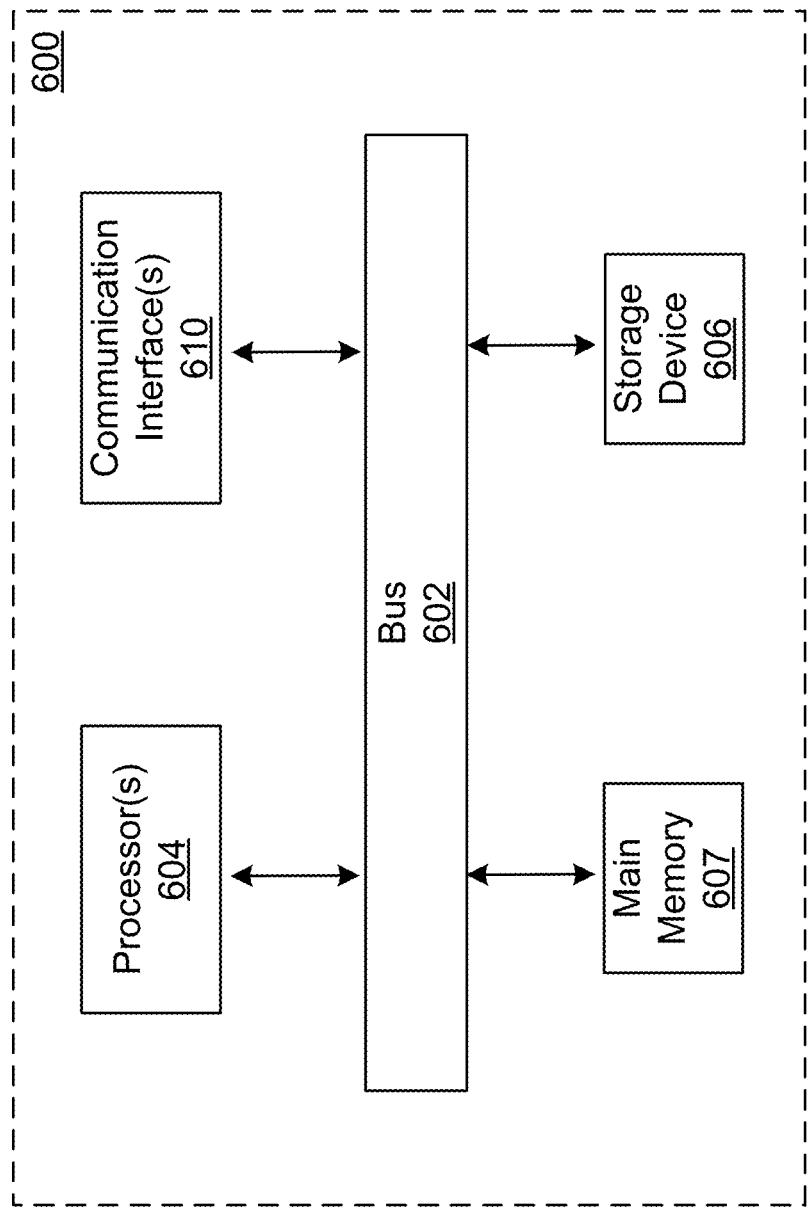
FIG. 6 illustrates an example computer system in which any of the embodiments described herein may be implemented.

FIG. 6 illustrates an example electronic device in which any of the embodiments described herein may be implemented. The electronic device may be used to implement one or more components of the systems and the methods shown in FIGS. 1-5. The electronic device 600 may comprise a bus 602 or other communication mechanism for communicating information and one or more hardware processors 604 coupled with bus 602 for processing information. Hardware processor(s) 604 may be, for example, one or more general purpose microprocessors.

The electronic device 600 may also include a main memory 607, such as a random-access memory (RAM), cache and/or other dynamic storage devices, coupled to bus 602 for storing information and instructions to be executed by processor(s) 604. Main memory 607 also may be used for storing temporary variables or other intermediate information during execution of instructions to be executed by processor(s) 604. Such instructions, when stored in storage media accessible to processor(s) 604, may render electronic device 600 into a special-purpose machine that is customized to perform the operations specified in the instructions. Main memory 607 may include non-volatile media and/or volatile media. Non-volatile media may include, for example, optical or magnetic disks. Volatile media may include dynamic memory. Common forms of media may include, for example, a RAM, a DRAM, a PROM, and EPROM, a FLASH-EPROM, NVRAM, any other memory chip or cartridge, or networked versions of the same.

The electronic device 600 may implement the techniques described herein using customized hard-wired logic, one or more ASICs or FPGAs, firmware and/or program logic which in combination with the electronic device may cause or program electronic device 600 to be a special-purpose machine. According to one embodiment, the techniques herein are performed by electronic device 600 in response to processor(s) 604 executing one or more sequences of one or more instructions contained in main memory 607. Such instructions may be read into main memory 607 from another storage medium, such as storage device 606. Execution of the sequences of instructions contained in main memory 607 may cause processor(s) 604 to perform the process steps described herein. For example, the processes/methods disclosed herein may be implemented by computer program instructions stored in main memory 607. When these instructions are executed by processor(s) 604, they may perform the steps as shown in corresponding figures and described above. In alternative embodiments, hard-wired circuitry may be used in place of or in combination with software instructions.

The electronic device 600 also includes a communication interface 610 coupled to bus 602. Communication interface 610 may provide a two-way data communication coupling to one or more network links that are connected to one or more networks. As another example, communication interface 610 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method for determining loan allocation, comprising:
   in a previous period of time:
      collecting, by an online decision system, historical data comprising a plurality of historical loan requests and a plurality of historical scores generated by a scoring model in the online decision system for a plurality of lenders based on the plurality of historical loan requests;
      constructing, by the online decision system, an optimization model based on the historical data, wherein the optimization model is configured to maximize a total amount of loans that would have been granted in the previous period of time;
      transforming, by the online decision system, the optimization model into a Lagrangian model comprising one or more multipliers corresponding to one or more constraints of the optimization model;
      solving, by the online decision system using a linear system, the Lagrangian model to determine one or more values of the one or more multipliers;
      updating, by the online decision system, the scoring model based on the one or more multipliers;
   in a current period of time:
      receiving, by the online decision system, a loan request from a user;
      iterating, by the online decision system, through the plurality of lenders to obtain a corresponding score for each lender based at least on the updated scoring model using parameters comprising: a projected approval rate for the lender to approve the loan request, a projected risk for the lender to serve the loan request, and the one or more multipliers applied to the projected approval rate and the projected risk;
      determining one of the plurality of lenders with a highest score to serve the loan request;
      collecting training data comprising the obtained scores from the current period of time;
      updating the optimization model based on the training data and transforming the updated optimization into an updated Lagrangian model;
      obtaining one or more updated multipliers by solving the updated Lagrangian model using the linear system; and
      further updating the scoring model in the online decision system for a next period of time based on the one or more updated multipliers;
   in the next period of time:
      determining, by the online decision system, allocation of incoming loan requests using the further updated scoring model.

2. The method of claim 1, wherein the projected risk is determined based at least on a projected default rate associated with the user, a risk tolerance ratio associated with each lender, and a projected loan amount to be provided by each lender to the user; and
   the historical data further comprises projected default rates associated with users of the previous period of time, risk tolerance ratios associated with the plurality of lenders during the previous period of time, and loan amounts that were projected by the plurality of lenders during the previous period of time.

3. The method of claim 2, wherein the one or more constraints comprise a first constraint for each lender that the risk tolerance ratio associated with the lender is no less than a ratio determined based at least on the projected default rate associated with the user and the projected loan amount to be provided to the user by the lender.

4. The method of claim 3, wherein the first constraint corresponds to a first multiplier, and the projected risk is associated with the first multiplier for obtaining the corresponding score for each lender.

5. The method of claim 1, wherein each lender is associated with a user flow percentage to determine a serving capacity of the lender for the previous period of time.

6. The method of claim 5, wherein the historical data further comprises a total number of users made requests during the previous period of time, and the serving capacity is determined based on a product of the user flow percentage associated with the lender and the total number of users made requests during the previous period of time.

7. The method of claim 5, wherein the one or more constraints further comprise a second constraint for each lender that a total number of users to be served by the lender is no more than the serving capacity of the lender.

8. The method of claim 7, wherein the second constraint corresponds to a second multiplier for obtaining the corresponding score for the lender.

9. The method of claim 5, wherein the user flow percentage associated with each lender is updated for the current period of time if a total number of users served by the lender during the previous period of time does not match the serving capacity of the lender for the previous period of time.

10. The method of claim 1, wherein the optimization model comprises decision variables, and a solution of the optimization model determines a binary value for each of the decision variables indicating whether to recommend a corresponding user to a corresponding lender.

11. An online decision system for determining loan allocation, comprising one or more processors and one or more non-transitory computer-readable memories coupled to the one or more processors and configured with instructions executable by the one or more processors to cause the system to perform operations comprising:
   in a previous period of time:
      collecting historical data comprising a plurality of historical loan requests and a plurality of historical scores generated by a scoring model in the online decision system for a plurality of lenders based on the plurality of historical loan requests;
      constructing an optimization model based on the historical data, wherein the optimization model is configured to maximize a total amount of loans that would have been granted in the previous period of time;
      transforming the optimization model into a Lagrangian model comprising one or more multipliers corresponding to one or more constraints of the optimization model;
      solving, using a linear system, the Lagrangian model to determine one or more values of the one or more multipliers;
      updating, by the online decision system, the scoring model based on the one or more multipliers;
   in a current period of time:
      receiving a loan request from a user;
      iterating through the plurality of lenders to obtain a corresponding score for each lender based at least on the updated scoring model using parameters comprising: a projected approval rate for the lender to approve the loan request, a projected risk for the lender to serve the loan request, and the one or more multipliers applied to the projected approval rate and the projected risk;
      determining one of the plurality of lenders with a highest score to serve the loan request;
      collecting training data comprising the obtained scores for the plurality of lenders and loan requests from the current period of time;
      updating the optimization model based on the training data and transforming the updated optimization into an updated Lagrangian model;
      obtaining one or more updated multipliers by solving the updated Lagrangian model using the linear system; and
      further updating the scoring model in the online decision system for a next period of time based on the one or more updated multipliers;
   in the next period of time:
      determining allocation of incoming loan requests using the further updated scoring model.

12. The system of claim 11, wherein the projected risk is determined based at least on a projected default rate associated with the user, a risk tolerance ratio associated with each lender, and a projected loan amount to be provided by each lender to the user; and
   the historical data further comprises projected default rates associated with users of the previous period of time, risk tolerance ratios associated with the plurality of lenders during the previous period of time, and loan amounts that were projected by the plurality of lenders during the previous period of time.

13. The system of claim 12, wherein the one or more constraints comprise a first constraint for each lender that the risk tolerance ratio associated with the lender is no less than a ratio determined based at least on the projected default rate associated with the user and the projected loan amount to be provided to the user by the lender.

14. A non-transitory computer-readable storage medium of an online decision system for determining loan allocation configured with instructions executable by one or more processors to cause the one or more processors to perform operations comprising:
   in a previous period of time:
      collecting historical data comprising a plurality of historical loan requests and a plurality of historical scores generated by a scoring model in the online decision system for a plurality of lenders based on the plurality of historical loan requests;
      constructing an optimization model based on the historical data, wherein the optimization model is configured to maximize a total amount of loans that would have been granted in the previous period of time;
      transforming the optimization model into a Lagrangian model comprising one or more multipliers corresponding to one or more constraints of the optimization model;
      solving, using a linear system, the Lagrangian model to determine values of the one or more multipliers;
      updating, by the online decision system, the scoring model based on the one or more multipliers;
   in a current period of time:
      receiving a loan request from a user;
      iterating through the plurality of lenders to obtain a corresponding score for each lender based at least on the updated scoring model using parameters comprising: a projected approval rate for the lender to approve the loan request, a projected risk for the lender to serve the loan request, and the one or more multipliers applied to the projected approval rate and the projected risk;
      determining one of the plurality of lenders with a highest score to serve the loan request;
      collecting training data comprising the obtained scores for the plurality of lenders and loan requests from the current period of time;
      updating the optimization model based on the training data and transforming the updated optimization into an updated Lagrangian model;

obtaining one or more updated multipliers by solving the updated Lagrangian model using the linear system; and further updating the scoring model in the online decision system for a next period of time based on the one or more updated multipliers;

in the next period of time:

determining allocation of incoming loan requests using the further updated scoring model.

15. The non-transitory computer-readable storage medium of claim 14, wherein the projected risk is determined based at least on a projected default rate associated with the user, a risk tolerance ratio associated with each lender, and a projected loan amount to be provided by each lender to the user; and the historical data further comprises projected default rates associated with users of the previous period of time, risk tolerance ratios associated with the plurality of lenders during the previous period of time, and loan amounts that were projected by the plurality of lenders during the previous period of time.

16. The non-transitory computer-readable storage medium of claim 15, wherein the one or more constraints comprise a first constraint for each lender that the risk tolerance ratio associated with the lender is no less than a ratio determined based at least on the projected default rate associated with the user and the projected loan amount to be provided to the user by the lender.

* * * * *